(12) United States Patent
Wang

(10) Patent No.: US 6,659,341 B1
(45) Date of Patent: Dec. 9, 2003

(54) AUTOMATED TRANSACTION MACHINE APPARATUS AND METHOD

(75) Inventor: Zen Y. Wang, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 176 days.

(21) Appl. No.: 09/884,247

(22) Filed: Jun. 19, 2001

Related U.S. Application Data

(60) Provisional application No. 60/212,992, filed on Jun. 21, 2000.

(51) Int. Cl.[7] .............................................. G06F 17/60
(52) U.S. Cl. ..................................................... 235/379
(58) Field of Search ................................ 235/379, 380; 705/16

(56) References Cited

U.S. PATENT DOCUMENTS 4,786,789 A * 11/1988 Gaucher .................... 235/432
5,457,305 A * 10/1995 Akel et al. .................. 705/45
5,679,940 A * 10/1997 Templeton et al. ......... 235/380
6,109,521 A *  8/2000 Martinez et al. ............ 235/379

* cited by examiner

Primary Examiner—Thien M. Le
Assistant Examiner—Lisa M. Caputo
(74) Attorney, Agent, or Firm—Ralph E. Jocke; Daniel D. Wasil; Walker & Jocke

(57) ABSTRACT

An automated transaction machine has a document directing device. The document directing device enables the orientation of a document moving in a document path in the machine to be changed. An exemplary device enables a document to be simultaneously turned over and redirected in a direction generally normal to that in which the document is originally moved. The device may be used in a space-saving manner in association with a printer positioned behind a flat screen type display monitor. The device enables a printed document such as an account statement to be redirected toward a customer accessible opening in the customer interface of the automated transaction machine. The document directing device may also be used in the feeding of documents into an automated transaction machine.

29 Claims, 10 Drawing Sheets

AUTOMATED TRANSACTION MACHINE APPARATUS AND METHOD

CROSS REFERENCE TO RELATED APPLICATION

This Application claims benefit pursuant to 35 U.S.C. §119(e) of Provisional Application No. 60/212,992 filed Jun. 21, 2000.

TECHNICAL FIELD

This invention relates to an automated transaction machine for electronically carrying out transactions. More specifically the exemplary form of this invention relates to use of an arrangement including an electronic display and a document directing device in an automated transaction machine, wherein the display enables use of the device which enables documents moving in the machine to be simultaneously turned over and redirected at an approximately 90-degree angle.

BACKGROUND ART

Automated transaction machines are known in the prior art. A common type of automated transaction machine is an automated teller machine (ATM). ATMs have been developed which are capable of performing a variety of transactions including the dispensing of documents, such as currency notes, receipts, and account statements. Other types of transaction machines may dispense notes and other types of documents to users, such as bank tellers, cashiers, and other service providers. For purposes of this description an automated transaction machine on an ATM will be considered as referring to any machine that is capable of carrying out transactions including transfers of value.

On occasion the space available for an ATM may be limited. Thus, an area where an ATM is desired to be located may not be suitable because of the size and configuration of the ATM. The physical size required for the machine may be determined by certain components such as the display and the number and type of other devices that must be positioned in the ATM housing. For example, the minimum depth of an ATM housing may be determined by the depth of the CRT for the display used in the ATM. Alternatively, the number and/or character of components that are included within an ATM housing may require that the ATM have a housing that is not as small as may be desirable. Further, it may be desirable to add additional devices to an existing ATM but the fixed size of the housing does not make it possible to readily add such devices.

Thus, there exists a need to provide a more efficient space saving configuration of components in an ATM. There also exists a need to reduce the space that an ATM requires, including reducing the housing dimensions of an ATM. There further exists a need to provide additional devices within an ATM housing of a fixed size.

DISCLOSURE OF INVENTION

It is an object of an exemplary form of the present invention to provide an automated transaction machine.

It is a further object of an exemplary form of the present invention to provide an automated transaction machine which is capable of dispensing documents, such as currency notes, receipts, and account statements.

It is a further object of an exemplary form of the present invention to provide an automated transaction machine which is more compact in size.

It is a further object of an exemplary form of the present invention to provide an automated transaction machine capable of being used with a flat screen display monitor.

It is a further object of an exemplary form of the present invention to provide an automated transaction machine capable of dispensing documents with a device enabling a document to be simultaneously turned over and redirected at an approximately 90-degree angle.

It is a further object of an exemplary form of the present invention to provide an automated transaction machine with a document exit guide capable of varying its outlet height.

It is a further object of an exemplary form of the present invention to provide an automated transaction machine capable of having a document dispensing device, such as a printer, at least partly located in an area behind a display monitor, such as a flat screen display monitor.

It is a further object of an exemplary form of the present invention to provide an automated transaction machine that is economical to produce and to operate.

Further objects of exemplary forms of the present invention will be made apparent in the following Best Modes For Carrying Out Invention and the appended claims.

The foregoing objects are accomplished in an exemplary embodiment of the present invention by an automated transaction machine. The machine includes therein a flat screen display and a document directing apparatus. The document directing apparatus functions to simultaneously redirect and turn over a document that is moved within the machine. Thus, components for handling documents may be arranged in a space-saving manner by using the space within a housing behind a flat screen display and yet, because of the document directing apparatus, the documents can be properly directed through an opening in a fascia to a user of the machine.

In the exemplary embodiment the automated transaction machine comprises a customer accessible outlet, a display device, a document dispensing device, a document transport path extending from the document dispensing device to the outlet, and a document directing apparatus positioned in the document transport path. The display device includes a front portion adapted to display information and a rear portion. The document dispensing device is located in the machine housing such that it is at least partly located behind the display device and adjacent the rear portion. The document dispensing device is adapted to dispense a document with the face of the document generally horizontal and a leading edge of the document generally normal to the customer accessible outlet. The document directing apparatus is adapted to turn the leading edge of the document about 90 degrees as the document moves along the document transport path. The exemplary document directing apparatus includes a body having a body inlet and a body outlet. A document is adapted to enter the body through the inlet, and is adapted to exit the body through the outlet. The outlet is substantially transverse to the inlet. The body also has a curved wall intermediate the inlet and outlet. A document and its leading edge are able to be turned about 90 degrees by passing in engagement with the curved wall. This capability enables more options for the positioning of document dispensing and receiving devices within the housing of the machine.

BEST MODES FOR CARRYING OUT INVENTION

Figure 1:
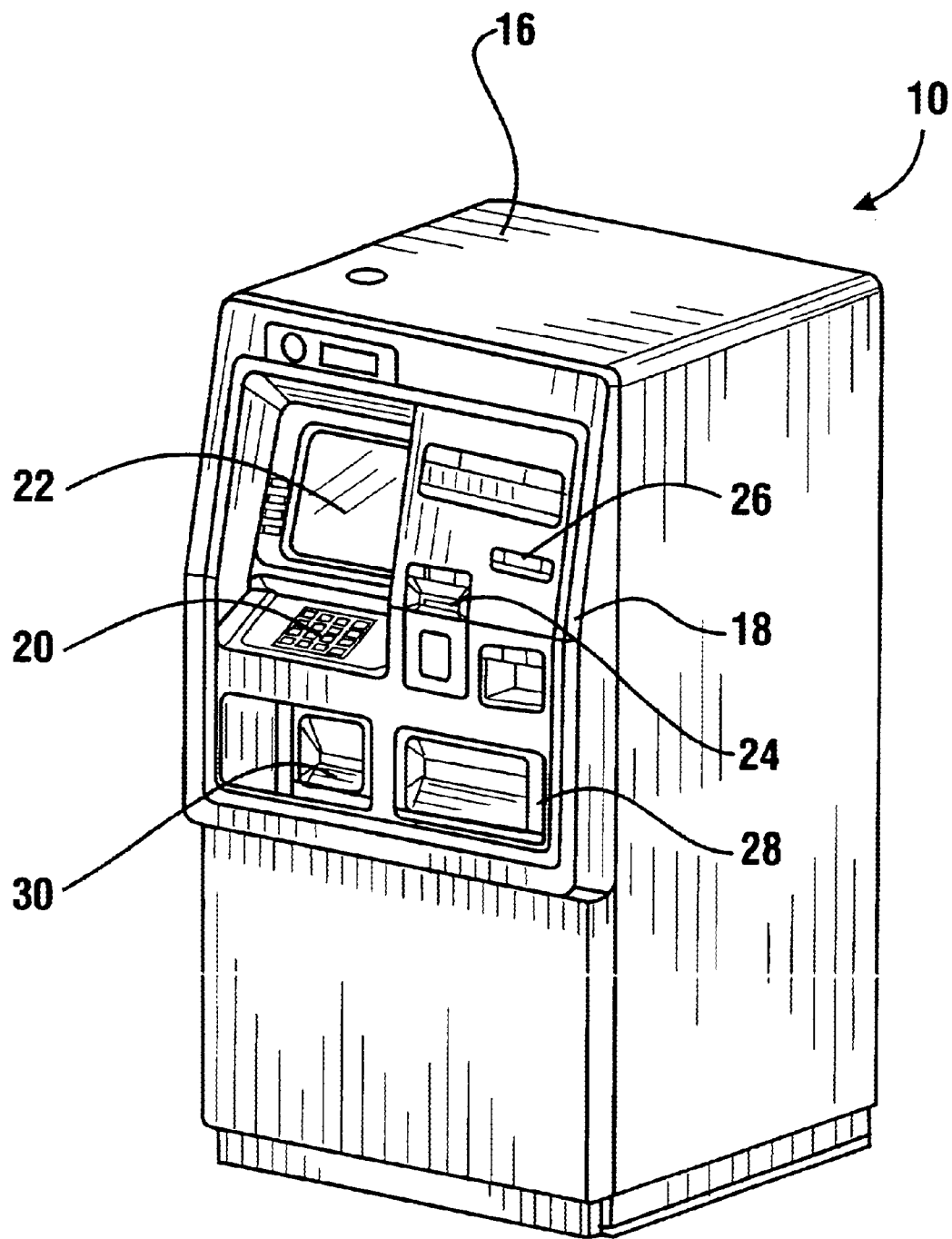
FIG. 1 shows an isometric view of an automated transaction machine of a type employing an exemplary embodiment of the present invention.

Referring now to the drawings and particularly to FIG. 1, there is shown therein an automated transaction machine apparatus generally indicated 10. The automated transaction machine may be an automated teller machine (ATM) operated by individuals to perform banking transactions. It should be understood however that other embodiments may be used in connection with machines whose primary functions include conducting other types of transactions. These may include for example the dispense of motor fuel, the dispense of tickets, the dispense of vouchers, the dispense of gaming materials or other functions that a user may carry out using the machine. In other embodiments the machine may be another type of transaction machine, such as check cashing machine, vending machine, or medication dispensing machine. The machine may be a transaction machine at which the identity of a user must be verified as an authorized user.

The machine 10 has a housing or enclosure 12 which includes a pair of spaced side walls 14 and a top wall 16. The machine further includes a front fascia panel 18 which generally includes the customer interface for the machine. Fascia panel 18 has extending thereon or accessible therethrough a keyboard 20, a display screen 22, a customer card accepting slot 24, and a receipt delivery opening 26. The machine further includes a customer accessible slot or opening 28 for delivery of documents such as cash or printed account statements to a customer, as well as a deposit accepting opening 30. Of course, the fascia panel may have other openings and/or components accessible therethrough, such as a camera or a compartment for holding a supply of depository envelopes. Furthermore, the fascia panel may have different sized openings corresponding to different sized documents to be dispensed or deposited. Therefore, the fascia panel may be provided with a plurality of customer accessible openings having different shapes and sizes.

Users are enabled to input data and instructions to the machine through input devices on the user interface, such as by selectively pressing the keys which make up the keyboard 20. Data may also be input by providing a display screen having touch screen input features. The user interface may also include one or more output devices, such as the display, speakers or other output devices. The display in some embodiments may be a CRT or LCD type display that is operative to display messages to a user, including messages which instruct the user in operation of the machine and/or promotional messages. The display in some embodiments may be of the flat screen type having a relatively thin, flat body.

It should be understood that the user interface including the input devices and output devices shown is exemplary and that other embodiments of the invention may employ additional or other types of input and output devices. These include for example other types of card readers for reading magnetic stripe or other types of cards, which cards may include data which may be used to identify a user and/or an associated account. These may include for example motorized readers, swipe type readers or dip readers. Other types of cards may also be employed with the machine. Such cards include so called "smart cards" which include a programmable memory with data thereon. Such data may include information about the user and their accounts. Such cards may also include information representative of monetary value. Such value may be deducted from the memory as the card is used to conduct transactions. Some cards may have the value thereon periodically replenished.

Other types of input devices may be used which read articles such as articles encoded with optical indicia which can be used to identify the user or their accounts. Other types of input devices may include biometric type reading devices such as fingerprint readers, retina scan devices, iris scan devices, facial recognition devices, speech recognition devices or other types of input devices which are capable of providing an input which can identify a particular user and/or their accounts. Furthermore, authorization and/or identification of the user of the transaction machine may be determined based on the user's appearance and/or voice characteristics and/or other biometric information and/or card information.

The keyboard and function keys which serve as input devices in an exemplary embodiment may be replaced in other embodiments by other types of devices which are capable of selectively receiving data or instructions from a user. Other types of output devices may also be used. These may include other types of visual and nonvisual output devices which are capable of communicating a message to a user or which can instruct the user in the operation of the machine. Of course exemplary automated transaction machines may include other devices which carry out other functions, and other types of input and output devices associated with carrying out those other functions may also be included in the machines. These may include for example switching and control devices for controlling the dispense of motor fuel when the machine of the invention is incorporated with a motor fuel dispensing device. Of course, the particular additional devices may depend on the environment in which the invention is used.

The machine may have other features or devices such as a check acceptor, cash acceptor, coin acceptor, travelers check acceptor, bill acceptor, bill reader, money order dispenser, ticket dispenser, biometric reader, smart card reader, and devices for achieving appearance and/or voice recognition. The machine may include a currency recycling mechanism, wherein deposited currency is validated and stored in the machine, and later selectively dispensed to a customer and/or merchant. Examples of such mechanisms are shown in U.S. Pat. Nos. 6,227,446 and 6,131,809 the disclosures of which are incorporated herein by reference.

The machine 10 may be a lobby-installed unit which is freestanding within the confines of a bank, grocery store, gas station, or other facility where customers may wish to conduct financial transactions or other types of transactions on an automated basis. Alternative forms of transaction machines of the present invention may be a through the wall type machine supported by or built into a wall or other structure of a building.

The housing or enclosure of an automated transaction machine may have a plurality of components mounted therein. Document drive components, such as belts and motors, can be used to move documents in document transport paths. Other components may include a receipt providing device, an account statement providing device, and a journal providing device. One or more printers may be associated with these devices. For example, the journal device may include a journal printer which makes a permanent hard copy record of transactions which are carried out by the machine. Of course, other components may be mounted therein as well, including a card reader and an internal enclosure for holding cards that a customer has attempted to use which are invalid or which have been reported stolen. These components may be mounted in an upper portion of the machine as shown in the exemplary embodiment.

The enclosure of the machine may also include a secure chest which houses a supply of currency to be dispensed from the machine and a currency dispensing mechanism. The chest may have a depository apparatus which accepts and stores deposits made by customers who use the machine. The chest has an access door thereto, which is generally a high security door controlled by a lock. The chest may be located in a lower portion of the machine as shown in the exemplary embodiment.

The interior area of the machine may include various additional components. Such components may include for example a document storage module for holding documents within the machine. The document storage module may be used to hold currency bills or other items such as for example, tickets, money orders, checks, scrip, gift certificates or other items. The document storage module or an item holding cassette which is engageable therewith, may be of a type that is readily removable and installable in the machine. Other devices within the interior of the machine may include a communications device. The communications device may be for example a modem, wireless transmitter, lease line interface connection, or other suitable device for communicating with other computers to carry out transactions with the machine. These other computers may include for example computers which operate in credit and/or debit card networks and/or an automated clearing house which are capable of handling transaction messages and settling accounts between users, sources of monetary value, and the operator of the machine. A controller may serve as a control device for controlling the electrical devices within the machine.

The machine may include one or more controllers. The controller may include an internal clock device. The controller is also in operative communication with a memory or data store which holds software programs and data for operation of the machine. The controller may, in various embodiments, include one or more processors or operatively connected computers which serve as an electrical signal source for devices which are in operative connection with the controller. The controller may be operative to communicate with the transaction function components and devices previously described, such as the input and output devices.

Figure 2:
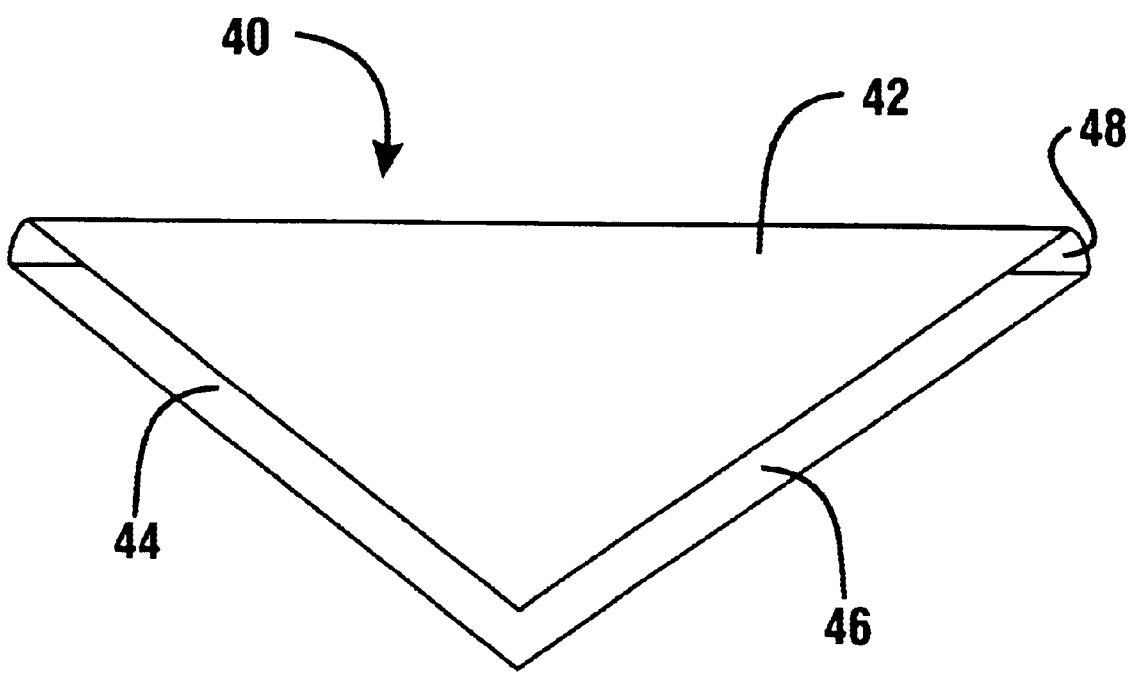
FIG. 2 shows an isometric view of a document directing device of an exemplary embodiment of the present invention.

An automated transaction machine may include a document directing device. Although the following description is directed to a document directing device for an automated transaction machine, the document directing device is not limited to use with an automated transaction machine but may also be applicable to any machine capable of directing documents, such as in the dispensing of documents. An exemplary embodiment of a document directing device of an exemplary embodiment is shown in FIG. 2. The document directing device 40 enables the turning or redirecting of a document, such as a currency note, bank note, sheet, account statement, receipt, photograph, ticket, scrip, envelope, or promotional material. The exemplary document directing device 40 may be configured for directing standard sized notes and documents, for example 8.5×11 inch sized paper sheets, or it may be configured for directing notes and documents of unconventional sizes and shapes. The document directing device may be structurally comprised of any material suitable for use in directing or guiding a document in an automated transaction machine. For example, the document directing device may be comprised of metal or plastic or wood or glass or any combination thereof.

The exemplary document directing device 40 includes a body 42. The body 42 has two openings 44, 46. For ease of understanding, the body 42 will be referred to as having a document inlet 44 and a document outlet 46. In the exemplary embodiment the outlet is substantially transverse to the inlet. A document delivered by one or more document delivery devices in the machine is enabled to enter the body at the inlet and exit the body at the outlet. In an exemplary embodiment, the outlet 46 may be arranged adjacent to a customer accessible slot or opening in the fascia of the automated transaction machine. However, it should be understood that the outlet 46 may also be arranged at any position between the document source, and the document destination, such as a customer accessible opening from which the document is delivered from the machine. For example, the outlet may be arranged adjacent to a document presenter device for accumulating documents in a stack and for presenting the collected stack of documents to a customer through the customer accessible opening. It should also be understood that while FIG. 2 shows the outlet opening to the right of the inlet opening, the inlet and outlet openings may be reversed so that the outlet opening is located to the left of the inlet opening. That is, either opening 44, 46 can constitute an inlet or an outlet.

The body also has at least one curved wall portion 48 located along the document transport path in the body, intermediate the openings 44, 46. The curved wall portion is arranged to join the inlet and the outlet. A document is able to be redirected by moving in engagement with the curved wall 48. The curved wall 48 enables a document to be redirected at an angle from the moving direction of a leading edge of the document when it enters into the body inlet. The angle at which the document is to be redirected may be predetermined based on the desired operating characteristics of the specific automated transaction machine. FIG. 2 shows the document directing device 40 having a redirecting angle of approximately 90 degrees, with the inlet and outlet openings being substantially perpendicular to each other, and the body 42 comprising a substantially triangular cross section. As a result when the document exits from the body the leading edge is moving in a direction generally transverse to the direction the leading edge was moving upon entry. However, it should be understood that the curved wall may be designed and implemented to turn or redirect a document at any desired angle from its body inlet direction.

Figure 4:
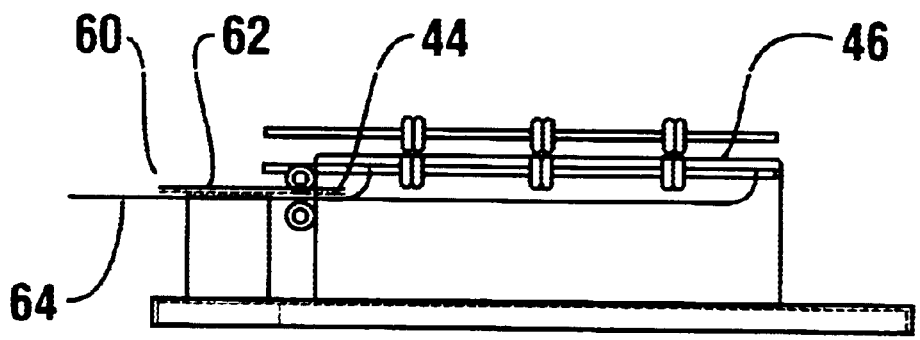
FIG. 4 shows a side view of the document directing device of FIG. 3.
Figure 5:
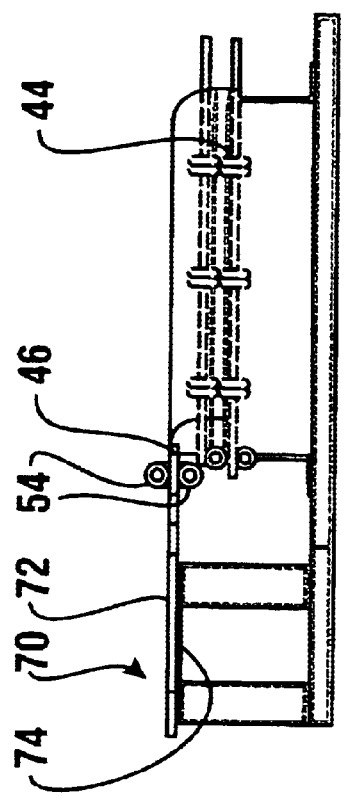
FIG. 5 shows another side view of the document directing device of FIG. 3.

During the redirecting of the document by the curved wall portion 48, the document is simultaneously turned over. As a result a first generally planar face of the document which is facing in a first facing direction upon entry to the turnover device is reoriented such that the first planar face is facing in an opposed facing direction upon exiting the turnover device. As shown in FIGS. 4 and 5 a document may exit the body 42 at an elevation relatively higher than its entry into the body. This is because as the document passes along and in engagement with the curved wall 48 it follows the wall to a higher elevation while it is being turned over or flipped. The document can then follow an upper wall of the body until it exits the body at the higher elevation.

Figure 3:
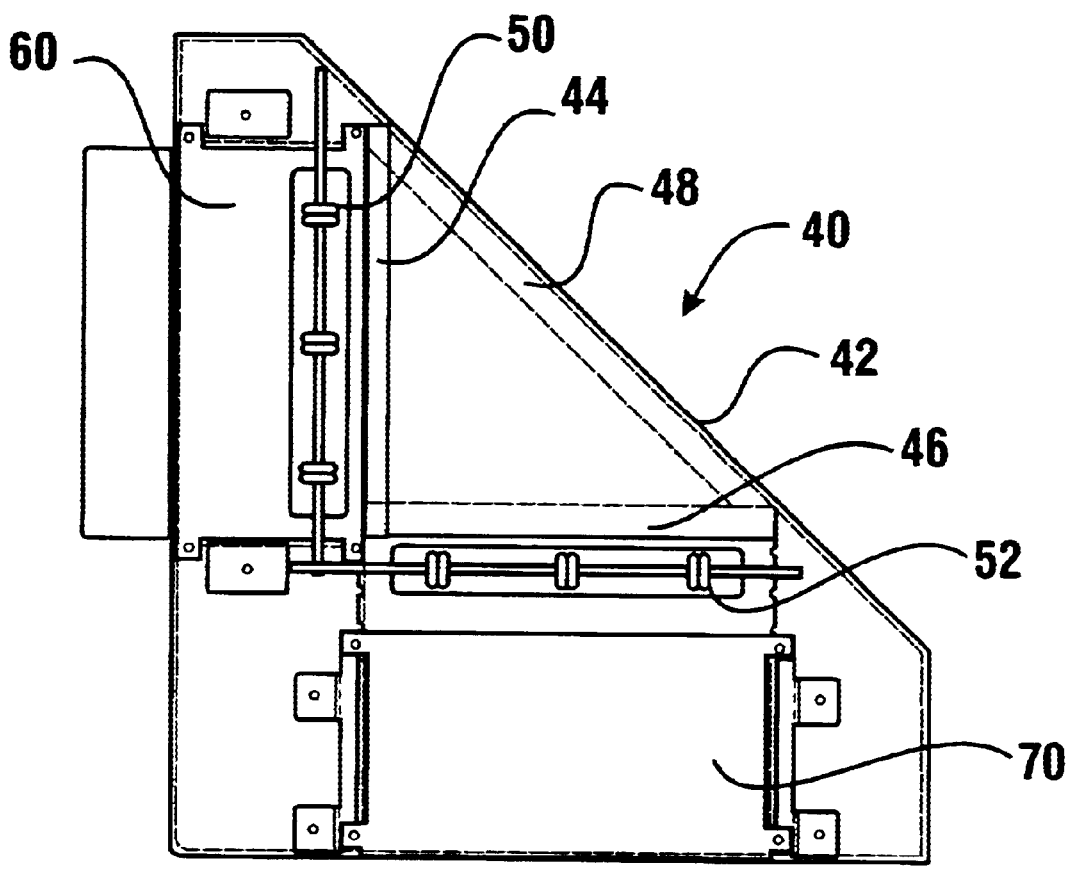
FIG. 3 shows a top view the document directing device of FIG. 2 and additional features.
Figure 7:
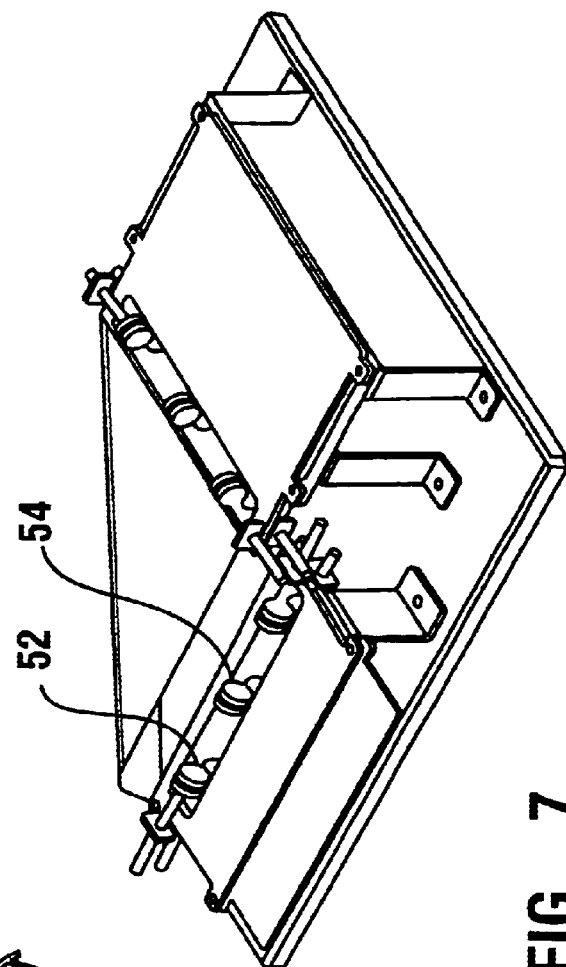
FIG. 7 shows another isometric angled view of the document directing device of FIG. 3.
Figure 6:
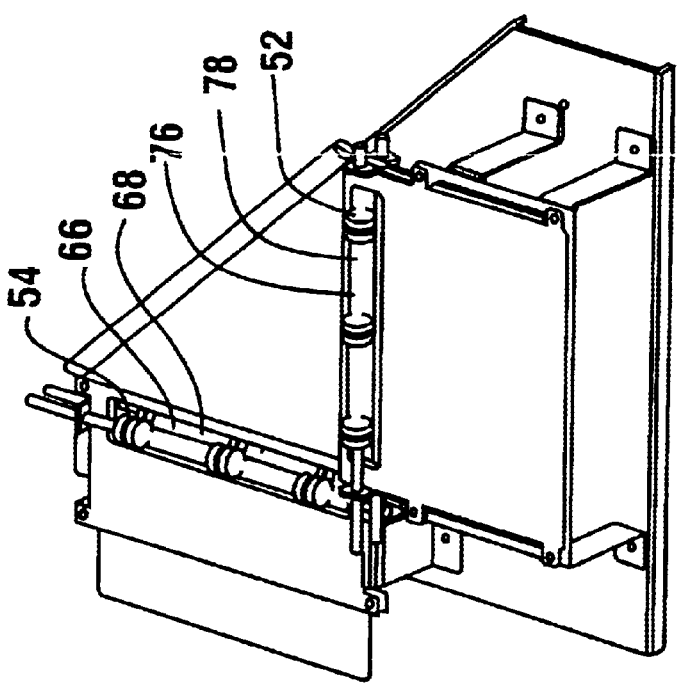
FIG. 6 shows an isometric angled view of the document directing device of FIG. 3.

As shown in FIG. 3 the exemplary document directing device 40 may further include moving devices 50 to assist in the movement of a document through the body 42. The moving devices may be positioned adjacent the inlet 44 and the outlet 46. A document moving device may comprise a roller arrangement 52. As shown in FIGS. 5, 6, and 7 the exemplary roller arrangement 52 may include plural pairs of abutting moving rollers 54 adapted to engage and move a document. In some embodiments the moving rollers may engage a document by extending through openings in the wall portion(s). It should be understood that the document moving devices are not limited to roller arrangements, and that other document moving devices such as belts, grippers, movable members, differential pressure mechanisms, etc., may be used to assist in moving a document.

To direct or guide a document into the inlet 44 an entry guide 60 may be used. An entry guide 60 may be positioned adjacent the inlet 44 so that a document is adapted to slide along the entry guide. As shown in FIG. 4 the entry guide may include a first entry guide portion 62 and a second entry guide portion 64. The first and second guide portions 62, 64 are spaced and may be substantially parallel so that a document is adapted to slide between the first and second entry guide portions. The first and second entry guide portions 62, 64 may each include an opening. As shown in FIG. 6 the openings 66, 68 may be aligned. The openings 66, 68 are each configured to enable a roller arrangement roller 54 to extend therein. Thus a roller 54 is able to extend into the first entry guide portion opening 66, and a roller 54 is able to extend into the second entry guide portion opening 68.

The outlet may also have a guide adjacent thereto similar to the entry guide. To direct or guide a document from the outlet 46 an exit guide 70 may be used. The exit guide 70 may be positioned adjacent the outlet 46 so that a document exiting from the body is adapted to slide along the exit guide. As shown in FIG. 5 the exit guide 70 may include a first exit guide portion 72 and a second exit guide portion 74. The first and second guide portions 72, 74 are spaced and may be substantially parallel so that a document is adapted to slide between the first and second exit guide portions. The first and second exit guide portions 72, 74 may each include an opening. As shown in FIG. 6 the openings 76, 78 may be aligned. The openings 76, 78 are each configured to enable a roller arrangement roller 54 to extend therein. Thus a roller 54 is able to extend into the first exit guide portion opening 76, and a roller 54 is able to extend into the second exit guide portion opening 78.

A document enters the exit guide 70 at an inlet and departs the exit guide at an outlet. The exit guide 70 may be adjustable enabling variations in height or elevation at the outlet of the guide. The outlet height of the exit guide 70 may be vertically adjustable to dispense a document at an elevation higher or lower than the inlet of the exit guide. The adjustment may be made manually or by using raising and lowering devices such as mechanical, electrical, hydraulic, pneumatic devices, or any combination thereof. This feature enables the exit guide outlet to be positioned at one of several vertical locations, such as in alignment with an existing or a new customer opening in a retrofit ATM. The exit guide shown may also be extended or shortened, or may be used in conjunction with other exit guides and/or document moving devices to dispense a document at its proper location in the ATM. Additionally, exit guides may be placed at angles relative to each other and/or have one or more curves for use in directing a document in both vertical and horizontal directions.

Figure 8:
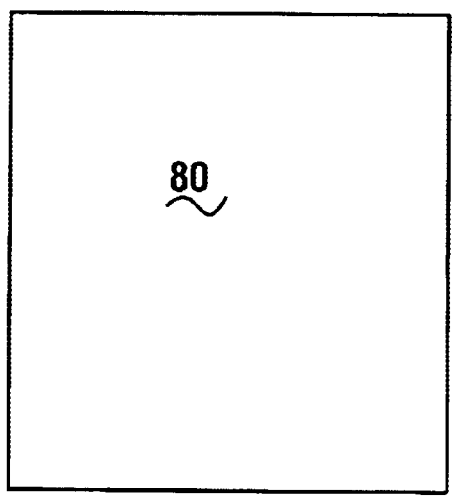
FIG. 8 shows a top view of an arrangement having a display monitor, printer, and document directing device in an automated transaction machine.
Figure 8:
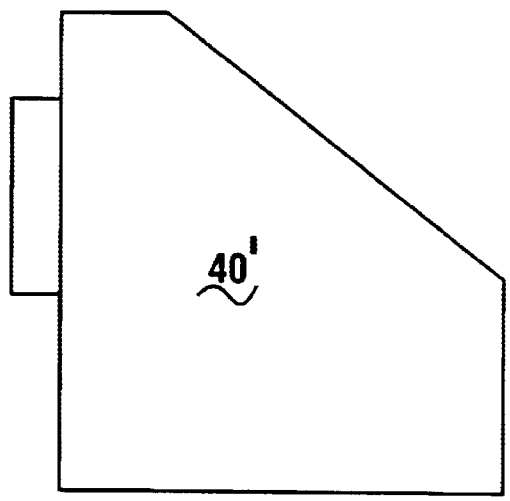
Figure 8:
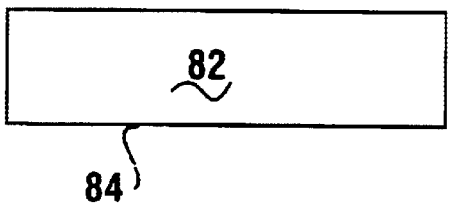
Figure 9:
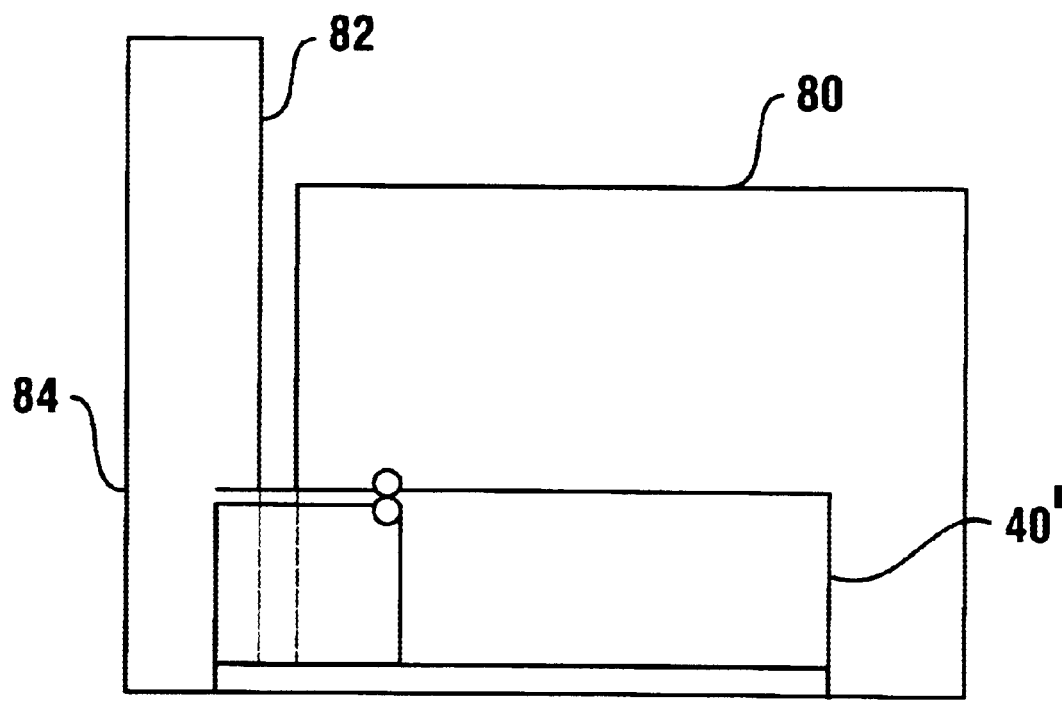
FIG. 9 shows a side view of the arrangement of FIG. 8.

FIGS. 8 and 9 show an arrangement of a printer 80, a display monitor 82, and a document directing device 40' in an automated transaction machine. In operation the printer 80 serves as a document delivery device and dispenses a printed document toward the document directing device 40'. For example, the printer may comprise a statement printer which produces one or more account statement sheets responsive to one or more inputs by a customer to the input devices on the machine. The outlet of the document directing device 40', e.g., the outlet of the body or the outlet of the exit guide, can be arranged in close relation with the housing of the ATM so that a document may be directly presented to a customer at a customer accessible opening. However, as discussed later, the outlet of the document directing device may also be arranged adjacent to a document transport device, such as a presenter, which then presents the documents to a customer at the customer accessible opening.

The display monitor 82 may comprise a flat screen 84 and a relatively thin, flat body. Specifically in this exemplary arrangement the screen of the display has a facing direction that is generally transverse to both the facing direction of the planar faces of documents delivered from the printer and the direction in which documents are moving when delivered from the printer. The use of a flat screen type display permits the space required in an ATM to be reduced. Hence, the machine components can be arranged or changed in the ATM so as to occupy less space. Therefore, the components in the ATM can be rearranged in a more efficient manner or more or different types of transaction function components may be positioned within an allotted space so as to provide more types of transactions. The space-saving arrangement shown in FIG. 8 enables a document delivery or dispensing device, such as a printer 80, to be at least partly positioned behind the display monitor 82. This feature of using a flat screen type display to free up space behind the display monitor may also permit easier servicing of the display monitor and other machine components. The use of a flat screen type display may also in some embodiments enable the size of the ATM to be reduced in one or more dimensions, including length, width, and height. Alternatively, replacing a CRT type display with a flat screen type display enables placing additional types of document delivery devices, such as printing devices, such as a laser or color printer, or another type of printer or dispenser device, or additional stocks of sheets, ticket stock or other media, in the space which is made available.

Because in this exemplary embodiment, the document delivery device namely the printer 80, may be positioned lengthwise behind the display 82 or another ATM component, its outlet may be positioned at an angle to the customer accessible opening in the automated transaction machine. Hence, the printer may not be capable of dispensing a document moving in a direction directly toward the customer accessible opening. Therefore, one or more document directing devices 40' may be arranged in the ATM to assist in redirecting a printed document toward the customer accessible opening.

Of course it should be understood that a document directing device is not limited to use with a printer. A document directing device may be employed to assist in directing other non-printed or preprinted documents, such as currency notes, statements, promotional and other material, to a customer or to another location in the machine. Additionally, the turning over of a document by the document directing device may enable the document to be provided at a desired orientation. For example, a document directing device may be arranged in a manner such that sheets are presented to a customer in a face up orientation. A document directing device may also be arranged in the machine to turn over documents such that they are properly positioned for reading or inspecting.

In FIG. 8 the printer outlet is shown positioned adjacent to the document directing device 40'. The flat screen 84 and the customer accessible opening are located adjacent the fascia of the automated transaction machine and may be parallel with each other. Hence, the outlet to the printer 80 is positioned generally perpendicular relative to the facing direction flat screen 84. Therefore, the printer 80 would deliver documents at an angle away from the customer accessible opening. The document directing device 40' is shown positioned to accept a printed document from the printer 80 and redirect that document about 90 degrees toward the customer accessible opening at the customer interface of the ATM. FIG. 9 shows a side view of the arrangement set forth in FIG. 8.

Of course it should be understood that the arrangement of a document delivery device such as a printer, a display monitor, and a document directing device is not limited to that shown in FIGS. 8 and 9, and that other arrangements or configurations may be used. For example, the document delivery device may be positioned on its side in an ATM to further provide efficient use of space. Furthermore, a document delivery device may be positioned on its side behind a flat screen display to maximize efficiency of component space in the ATM. Plural document directing devices may be arranged in relation to each other or to other components to redirect a document to a particular location or elevation. Additionally, one or more document directing devices may also be positioned at a horizontal or vertical angle, such as on their side.

Figure 10:
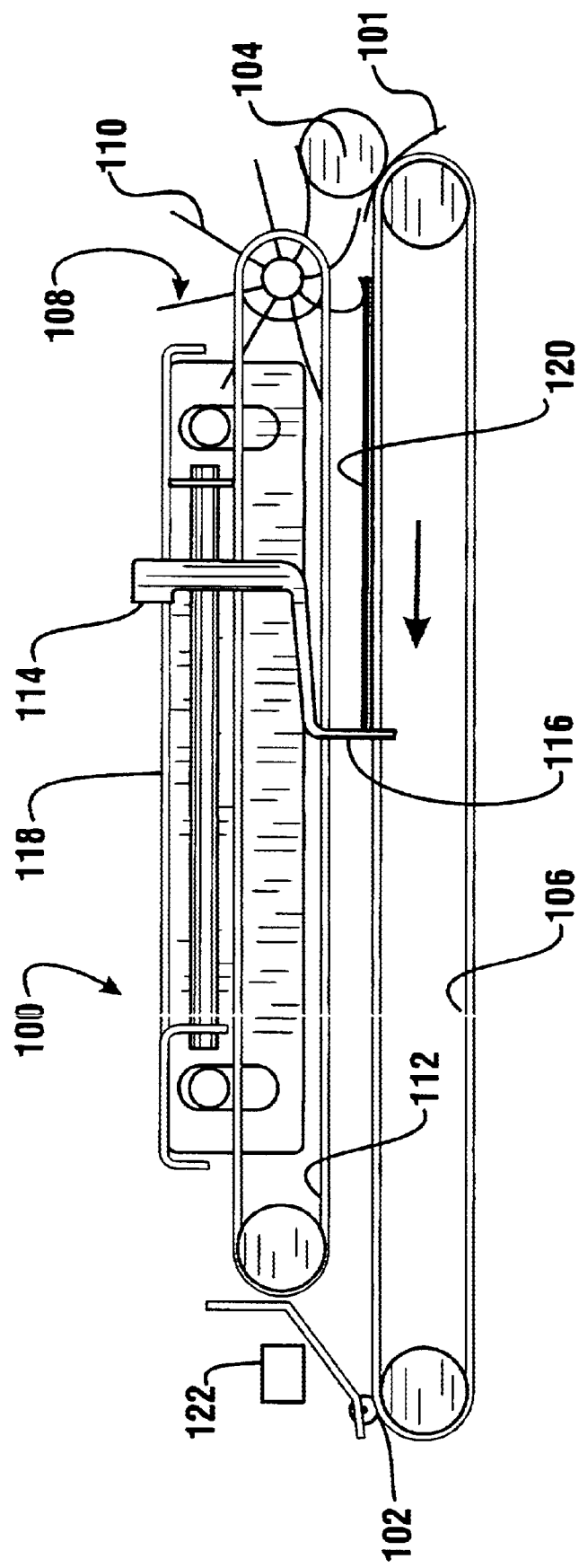
FIG. 10 shows a side view of a document presenter of an exemplary embodiment of the present invention.

An example of a document presenter is shown in FIG. 10. The document presenter 100 may be used to transport documents between a document directing device to a customer accessible opening 102 in an automated transaction machine. The presenter 100 is capable of stacking a plurality of documents and presenting the stack of documents. The presenter may be positioned adjacent the outlet of the body or the outlet of the exit guide of a document directing device. After the document exits the document directing device, it may be received by the document presenter which either delivers the document alone or as a part of a stack to the customer or, if a customer fails to take the document, retracts it back into the machine where it can be recycled or stored until removed by a technician.

As shown in FIG. 10, a document 101, which may have exited a document directing device, is pulled by a set of rollers 104 which ride on lower belts 106. The rollers pull the document 101 into the presenter 100. As the document begins to exit the rollers, a flapper mechanism 108 provides rotational contact against the document using flexible arms 110. The flexible arms 110 urge the document to continue its movement away from the rollers 104 and to continue into contact with the moving lower belt 106 which moves toward the customer accessible opening 102 as shown in FIG. 10. Upper belts 112 may move in coordination with the lower belts 106 to further help to guide the document into position.

A document may move on the lower belts 106 until the leading edge of the document abuttingly contacts a document stop 114. The stop has fingers 116 that extend transversely downward between the lower belts. The stop is movable on a document stop frame assembly 118. Generally, the lower belts will continue moving for a few moments after the document has engaged the fingers of the stop under the control of the machine controller thereby assuring that the document has reached the stop. Once this has occurred, the belts can be stopped until the next document, if any, arrives from the document directing device. One or more motors may be used to drive the belts.

In operation, once the documents are collected in a stack against the document stop 114, one or more motors may be operated to raise the paper stop and lower the upper belts. The upper and lower belts may then cooperatively move the stack forward, thereby moving the stack 120 of documents toward a customer accessible opening 102.

An exit sensor 122, which is preferably a photosensor or similar device, senses when the leading edge of the documents have passed through the opening 102. In an exemplary embodiment of the invention the machine is designed so that the documents in this position are extending through the opening 102 and are accessible by the customer. A movable gate may be used to close the opening when documents are not to be extended therethrough. Movement of the gate may be controlled by a suitable actuator which moves the gate in response to signals from a controller. An example of a suitable document presenter for some embodiments may be of the type discussed in U.S. Pat. No. 5,435,542 which is incorporated by reference as if fully rewritten herein. It should be understood that an automated transaction machine of the invention is not limited to those including a document presenter. As previously discussed, documents may be transported to a customer in some other manner, such as by using a document directing device or some other transport device to directly present the documents to the customer.

Figure 11:
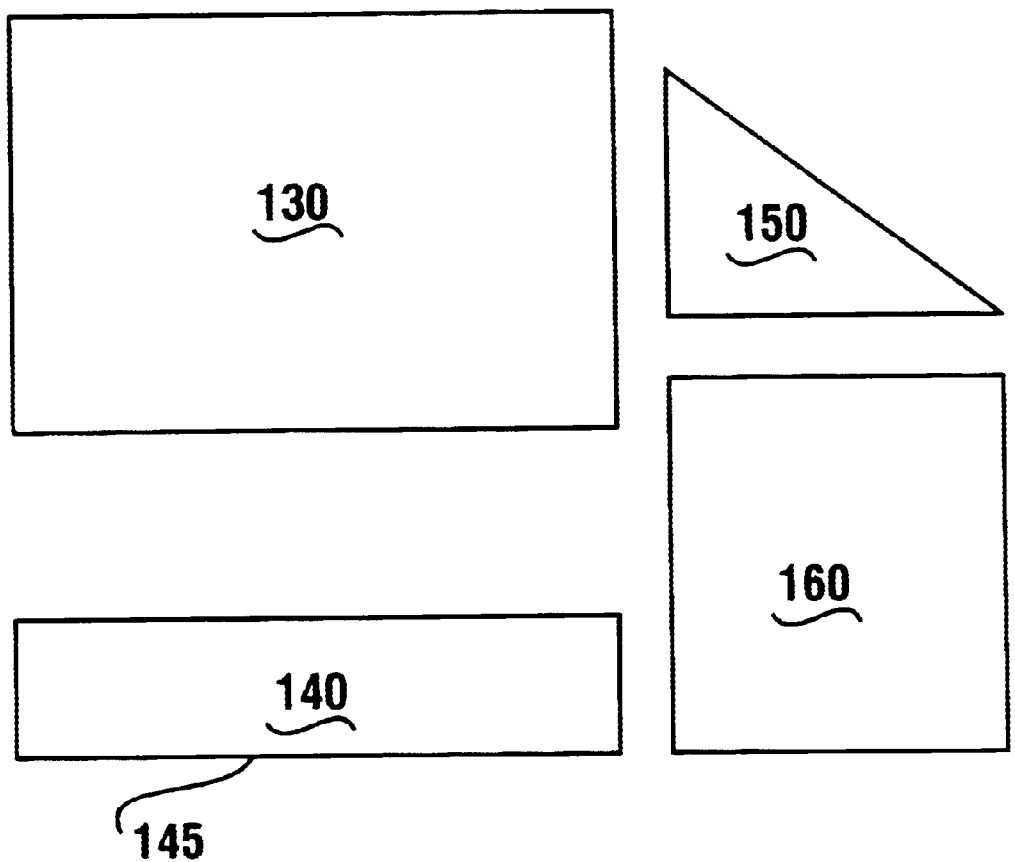
FIG. 11 shows a top view of an arrangement having a display monitor, printer, document directing device, and document presenter in an automated transaction machine.

FIG. 11 shows a top view of an arrangement of a document dispensing device such as a printer 130, a display monitor 140, a document directing device 150, and a document presenter 160 in an automated transaction machine. The arrangement of FIG. 11 is similar to that of FIG. 8 except that a document presenter 160 is also utilized. Again the use of a display with a generally flat screen 145 enables the size of the ATM housing to be reduced. Hence, the machine components can be rearranged in the ATM in less space. It should also be understood that the additional space provided by use of a flat screen type display may be used to provide additional transaction components, such that the size of the ATM remains unchanged but the machine provides greater functionality. Further through use of document directing apparatus such as the turnover device the additional transaction components may be arranged in ways that would not otherwise be suitable.

As shown in FIG. 11 the printer 130, document directing device 150, and document presenter 160 are all included in the transport path of a document. A document is enabled to be transported from the printer 130 to the document directing device 150 and then to the document presenter 160 and then out of the machine to a user. Upon exiting the presenter 160 the document may be placed, either individually or as part of a stack of documents, adjacent to a housing opening to be accessed by a customer or user of the automated transaction machine. The presenter 160 may be used to directly present the document through the housing opening, or the presenter may pass the document to another document handling device for further transport, storage or processing.

Figure 12:
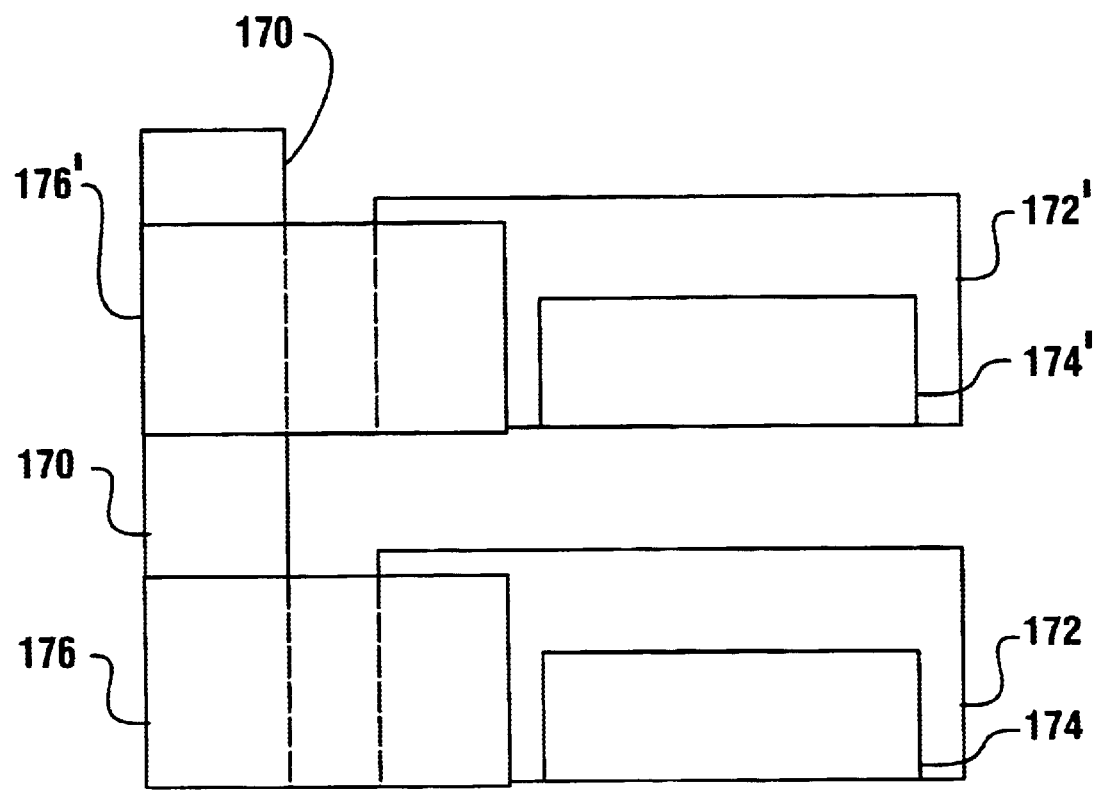
FIG. 12 shows an arrangement of a display monitor with plural other devices in an automated transaction machine.

It should be understood that the arrangement of the machine components shown in FIG. 11 is but one of many possible arrangements. For example, plural document delivery devices such as plural printers, and document directing devices and document presenters may be used in the space saved due to use of a flat screen type display. Components may be stacked, including placing stacked document delivery devices or other components in the space behind the display monitor. FIG. 12 shows an exemplary arrangement having a single display monitor 170 with plural printers 172, 172', document directing devices 174, 174', and document presenters 176, 176' in an automated transaction machine. Also, a common document presenter may be used with plural printers and/or plural document directing devices. Furthermore, other document handling devices and transporting devices may be used in the transport of a document, such as document supply devices, document inspection devices, and alignment and guiding devices.

Figure 13:
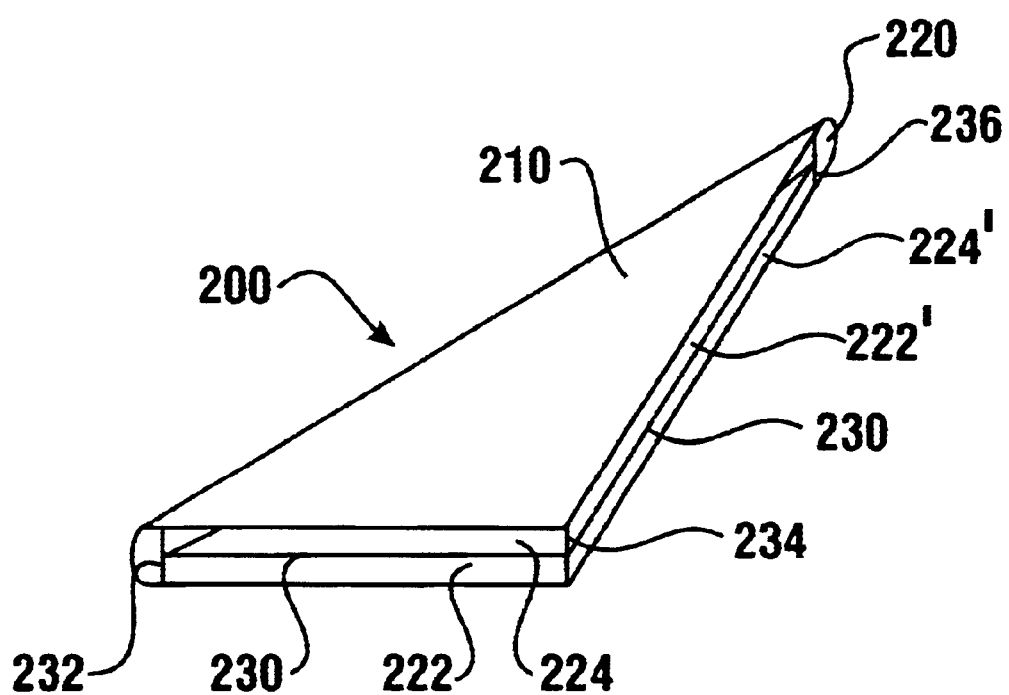
FIG. 13 shows an isometric view of a document directing device of an exemplary embodiment of the present invention.

Another exemplary embodiment of a document directing device is shown in FIG. 13. The document directing device 200 includes a body 210. The body has a curved wall 220, plural openings 222, 222', 224, 224', and a center partition 230. The center partition divides the body into an upper portion and a lower portion. A plurality of end supports 232, 234, 236 may be provided to assist in affixing the partition in the body. The supports may comprise attaching devices such as for example fasteners and/or welds. The center partition 230 enables a document to exit at an elevation higher or lower than its entry into the document directing device. The upper and lower passages created by the partition 230 are designed narrow enough so that a document can only be turned in one direction when it contacts and moves in passing engagement with the curved wall. The body is designed so that a document entering at opening 222 exits at opening 222', and vice versa, i.e., a document entering at opening 222' exits at opening 222. Likewise, a document entering at opening 224 exits at opening 224', and vice versa. The document directing device 200 may also include some or all of the features, attachments, moving devices and arrangements of the previously described document directing devices or other additional features.

Existing ATMs may be retrofit in a space-saving manner to achieve the benefits of using a flat screen type display monitor and/or a document directing device. For example, a document directing device permits an existing ATM to take advantage of the space saving features provided by using a flat screen type display monitor. As previously discussed, removing and replacing a CRT type display with a flat screen display makes available a space saved area inside the machine behind the display. Of course it should be understood that by rearranging components, this saved space may be allocated to any area of the ATM. Therefore, use of a flat screen display enables a device, such as a document delivery or dispensing device, to be at least partly located in the space behind the flat screen display. The document delivery and dispensing device, such as a printer, can be positioned lengthwise behind the display to dispense a document with the face of the document generally horizontal and a leading edge of the document generally normal to the outlet through the fascia of the ATM. The document directing device is able to turn the document 90 degrees so that the leading edge of the document is generally parallel to the outlet of the ATM. Thus, the document directing device permits increased spacing efficiency in an automated transaction machine.

A retrofit operation for an automated transaction machine may comprise the steps of removing an existing display; installing a display having a shallower profile such as a flat screen type display; placing a document delivery or dispensing device, such as a printer, in at least a portion of the space made available by removal of the prior display; and installing a redirecting or turning device, such as a document directing device, that turns a document about 90 degrees as the document moves along a document path from the document dispensing device to a customer outlet.

Of course it should be understood that document directing devices of exemplary embodiments may also be used in the input or feeding in of documents into an ATM. Thus, for example a document directing device may be used in a currency recycling automated transaction machine. The document directing device may be used to assist in the dispensing of currency notes from a note storage area within the machine and assist in enabling the note storage area to be replenished without requiring a user to access an interior of the machine. A document directing device may be used wherever the angle of document flow path needs to be changed. Therefore, document directing devices of exemplary embodiments are not limited to the area adjacent the customer interface, but may also be used in other areas in the interior of the ATM. A document directing device may also be used where a document needs to be turned over or flipped.

The exemplary embodiments provide a novel automated transaction machine. The exemplary embodiments may be used to provide a machine that requires less space. The exemplary embodiments also provide a more efficient space saving configuration of components or the provision of additional components, and added functionality, in an automated transaction machine. The exemplary embodiments also provide a novel automated transaction machine component arrangement that improves the spacing and servicing efficiency of the components in the automated transaction machine. The exemplary embodiments further provide an automated transaction machine that enables operation of the machine in an enhanced and more efficient manner.

The exemplary embodiments also provide a novel document directing device that enables a document to be redirected in an automated transaction machine. The exemplary embodiments further provide a document directing device that improves the desired positioning and transport of a document in an automated transaction machine. The exemplary embodiments further provide a document directing device that enables a document to be turned over, flipped, or rotated to improve document orientation. The exemplary embodiments further provide a document directing device that enables a document to be simultaneously redirected and turned over during transport in an automated transaction machine. The exemplary embodiments further provide a document directing device that enables operation of an automated transaction machine in an enhanced and more efficient manner.

Thus, the exemplary embodiments of the present invention achieve at least some of the above stated objectives, eliminate difficulties encountered in the use of prior devices and systems, solve problems, and attain the desirable results described herein.

In the foregoing description certain terms have been used for brevity, clarity and understanding, however, no unnecessary limitations are to be implied. therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents.

Having described the features, discoveries, and principles of the invention, the manner in which it is constructed and operated, and the advantages and useful results attained, the new and useful structures, devices, elements, arrangements, parts, combinations, systems, equipment, methods, operations and relationships are set forth in the appended claims.

I claim:

1. An automated transaction machine apparatus comprising:
   a document directing device including:
      a body,
         wherein the body has an inlet, wherein a document is adapted to enter the body through the inlet,
         wherein the body has an outlet, wherein a document is adapted to exit the body through the outlet, wherein the outlet is substantially transverse to the inlet,
         wherein the body has a curved wall, wherein the curved wall is intermediate the inlet and outlet, wherein a document is adapted to pass along the curved wall, wherein the curved wall enables a document passing there along to be turned over,
      a first document moving device adjacent the inlet, wherein the first document moving device is adapted to assist entry of a document into the body,
      a second document moving device adjacent the outlet, wherein the second document moving device is adapted to assist exit of a document from the body.

2. The apparatus according to claim 1 wherein the curved wall joins the inlet and the outlet.

3. The apparatus according to claim 2 wherein the outlet is positioned at an elevation relatively higher than the inlet.

4. The apparatus according to claim 1 wherein the first document moving device comprises a first roller arrangement.

5. The apparatus according to claim 4 wherein the second document moving device comprises a second roller arrangement.

6. The apparatus according to claim 5 wherein the first roller arrangement includes plural pairs of abutting rollers, wherein the second roller arrangement includes plural pairs of abutting rollers, and wherein the first and second roller arrangements are adapted to grippingly move a document.

7. The apparatus according to claim 1 further comprising an entry guide positioned adjacent the inlet, wherein a document is adapted to slide along the entry guide.

8. The apparatus according to claim 7 wherein the entry guide includes a first guide portion and a second guide portion, wherein the first and second guide portions are spaced and are substantially parallel, and wherein a document is adapted to slide between the first and second entry guide portions.

9. The apparatus according to claim 8 wherein the first document moving device comprises a roller arrangement including rollers, wherein the first and second entry guide portions each include an opening, wherein a roller extends into the first guide portion opening and a roller extends into the second guide portion opening.

10. The apparatus according to claim 1 further comprising an exit guide positioned adjacent the outlet, wherein a document is adapted to slide along the exit guide.

11. The apparatus according to claim 10 wherein the exit guide includes a first guide portion and a second guide portion, wherein the first and second guide portions are spaced and are substantially parallel, and wherein a document is adapted to slide between the first and second exit guide portions.

12. The apparatus according to claim 11 wherein the second document moving device comprises a roller arrangement including rollers, wherein the first and second exit guide portions each include an opening, wherein a roller extends into the first guide portion opening and a roller extends into the second guide portion opening.

13. The apparatus according to claim 1 wherein a document passing from the inlet to the outlet is enabled to be simultaneously turned over approximately 180 degrees and redirected in a direction of movement at an angle of approximately 90 degrees.

14. The apparatus according to claim 1 further comprising a printer in operative connection with the document directing device, wherein the printer is positioned upstream of the inlet.

15. The apparatus according to claim 14 further comprising a display monitor, wherein the printer is at least partly located behind the display monitor.

16. The apparatus according to claim 15 wherein the display monitor comprises a flat screen display monitor.

17. The apparatus according to claim 1 further comprising a customer accessible outlet, a display device, a document dispensing device, and a document transport path extending from the document dispensing device to the outlet,
   wherein the display device includes a front portion adapted to display information and a rear portion, wherein the document dispensing device is at least partly located behind the display device adjacent the rear portion,
   wherein the document dispensing device is adapted to dispense a document with the face of the document generally horizontal and a leading edge of the document generally normal to the outlet,
   wherein the document directing device is positioned in the document transport path,
   wherein the document directing device is adapted to turn the leading edge of the document about 90 degrees as the document moves along the document transport path.

18. Automated transaction machine apparatus comprising:
   a document directing device including:
      a body, wherein the body comprises a substantially triangular cross section,
         wherein the body has an inlet, wherein a document is adapted to enter the body through the inlet,
         wherein the body has an outlet, wherein a document is adapted to exit the body through the outlet, wherein the outlet is substantially perpendicular to the inlet,
         wherein the body has a curved wall, wherein the curved wall joins the inlet and outlet, wherein a document is adapted to pass alone the curved wall, wherein the curved wall enables a document passing there along to be turned over, a first document moving device adjacent the inlet, wherein the first document moving device is adapted to assist entry of a document into the body, a second document moving device adjacent the outlet, wherein the second document moving device is adapted to assist exit of a document from the body.

19. An automated transaction machine apparatus comprising a customer accessible outlet, a display device, a document dispensing device, a document transport path extending from the document dispensing device to the outlet, and a document directing device positioned in the document transport path, wherein the display device includes a front portion adapted to display information and a rear portion, wherein the document dispensing device is at least partly located behind the display device adjacent the rear portion, wherein the document dispensing device is adapted to dispense a document with the face of the document generally horizontal and a leading edge of the document generally normal to the outlet, wherein the document directing device is adapted to turn the leading edge of the document about 90 degrees as the document moves along the document transport path, wherein the document directing device includes a body having a body inlet and a body outlet, wherein a document is adapted to enter the body through the inlet, wherein a document is adapted to exit the body through the outlet, and wherein the outlet is substantially transverse to the inlet, wherein the body has a curved wall, wherein the curved wall is intermediate the inlet and outlet, wherein a document is adapted to pass along the curved wall, wherein the curved wall enables the leading edge of the document to be turned about 90 degrees.

20. A method comprising:

(a) delivering a document from a device within an automated transaction machine in response to at least one user input to the machine, wherein the document is delivered from the device with a first generally planar face thereof facing in a first facing direction and a leading edge thereof moving in a first moving direction;

(b) moving the document in passing engagement with at least one curved wall portion within the machine, wherein the document is reoriented such that the first face is facing in a second facing direction generally opposed of the first facing direction and the leading edge is moving in a second moving direction generally transverse of the first moving direction;

(c) delivering the document out of the machine.

21. The method according to claim 20 wherein in step (b) both the facing direction of the first face and the moving direction of the leading edge are changed while moving in passing engagement with a single curved wall portion.

22. The method according to claim 20 and further comprising:

receiving a request from the user of the machine to receive an account statement;

wherein the document is delivered in step (a) responsive to receipt of the request from the user.

23. The method according to claim 20 and prior to step (b);

engaging the document with a first drive operative to move the document in the first moving direction.

24. The method according to claim 23 and subsequent to step (b);

engaging the document with a second drive operative to move the document in the second moving direction.

25. The method according to claim 24 wherein either the first drive or the second drive includes a moving roll extending through an opening in at least one wall portion.

26. The method according to claim 20 wherein the machine includes a display, wherein the display includes a screen, wherein the screen faces in a screen facing direction that is generally transverse to both the first facing direction and the first moving direction.

27. A method comprising:

(a) delivering a document from a device within an automated transaction machine in response to at least one user input to the machine, wherein the document is delivered from the device with a first generally planar face thereof facing in a first facing direction and a leading edge thereof moving in a first moving direction;

(b) moving the document in passing engagement with at least one curved wall portion within the machine, wherein the document is reoriented such that the first face is facing in a second facing direction generally opposed of the first facing direction and the leading edge is moving in a second moving direction generally transverse of the first moving direction;

(c) accumulating the document in a stack;

(d) delivering the document out of the machine with the stack.

28. A method comprising:

(a) receiving at least one user input to at least one input device of an automated transaction machine;

(b) moving a document along a document path in the automated transaction machine responsive to the at least one user input, between a document dispensing device and a user accessible opening in a housing of the machine;

(c) during at least a portion of step (b) moving the document in engagement with at least one curved wall portion within the machine, wherein the document is reoriented by engagement with the at least one curved wall portion such that a first planar face of the document is moved from facing in a first facing direction to facing in a second facing direction opposed of the first facing direction, and a leading edge of the document in a direction of movement is changed from moving in a first moving direction to moving in a second moving direction generally transverse to the first moving direction.

29. The method according to claim 28, wherein the document comprises at least one page of an account statement, wherein the at least one page is produced by a printer in the machine responsive to the at least one user input, and wherein the at least one page is delivered out of the machine through the user accessible opening.

* * * * *